United States Patent
Imamura et al.

(10) Patent No.: US 11,420,618 B2
(45) Date of Patent: Aug. 23, 2022

(54) DRIVING FORCE CONTROL METHOD AND SYSTEM FOR VEHICLE

(71) Applicant: MAZDA MOTOR CORPORATION, Hiroshima (JP)

(72) Inventors: Yasumasa Imamura, Hiroshima (JP); Yasushi Yagi, Hiroshima (JP); Tetsushi Marutani, Higashihiroshima (JP); Naoki Nobutani, Hiroshima (JP); Daisuke Kofu, Hiroshima (JP); Akihiro Tatara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 784 days.

(21) Appl. No.: 16/346,570

(22) PCT Filed: Nov. 2, 2017

(86) PCT No.: PCT/JP2017/039764
§ 371 (c)(1),
(2) Date: May 1, 2019

(87) PCT Pub. No.: WO2018/084253
PCT Pub. Date: May 11, 2018

(65) Prior Publication Data
US 2019/0263392 A1 Aug. 29, 2019

(30) Foreign Application Priority Data
Nov. 7, 2016 (JP) .............................. JP2016-216934

(51) Int. Cl.
*B60W 30/188* (2012.01)
*B60W 30/02* (2012.01)
(Continued)

(52) U.S. Cl.
CPC ........... *B60W 30/02* (2013.01); *B60K 17/348* (2013.01); *B60W 10/06* (2013.01);
(Continued)

(58) Field of Classification Search
CPC .... B60W 10/06; B60W 10/14; B60W 10/119; B60W 30/188; B60W 40/064; B60W 40/068; B60K 17/348
See application file for complete search history.

(56) References Cited

U.S. PATENT DOCUMENTS 6,015,192 A    1/2000  Fukumura
6,360,150 B1*  3/2002  Fukushima ......... B60T 8/17552
                                                701/41

(Continued)

FOREIGN PATENT DOCUMENTS

JP    H1035443 A    2/1998
JP    2004249971 A  9/2004

(Continued)

OTHER PUBLICATIONS

International Search Report issued in PCT/JP2017/039764; dated Feb. 6, 2018.
(Continued)

*Primary Examiner* — Edwin A Young
(74) *Attorney, Agent, or Firm* — Studebaker & Brackett PC (57) ABSTRACT

A driving force control device 1 for a vehicle V comprises: a D-μ map M1 defining a linear correlation between a driving stiffness D and a maximum road surface μ; a slip ratio calculation circuit 21 for calculating a slip ratio S of one of a pair of front road wheels 10L, 10R; a DS calculation circuit 22 for calculating the driving stiffness D corresponding to a value the slip ratio S calculated by the slip ratio calculation circuit 21; a maximum road surface μ calculation
(Continued)

circuit 23 for assigning a value of the driving stiffness D calculated by the DS calculation circuit 22 to the D-$\mu$ map M1 to calculate the maximum road surface $\mu$; and a driving force distribution circuit 24 for controlling a driving force, using a value of the maximum road surface $\mu$ calculated by the maximum road surface $\mu$ calculation circuit 23.

11 Claims, 9 Drawing Sheets

(51) Int. Cl.
*B60K 17/348* (2006.01)
*B60W 10/06* (2006.01)
*B60W 10/119* (2012.01)
*B60W 10/14* (2012.01)
*B60W 40/064* (2012.01)
*B60W 40/068* (2012.01)

(52) U.S. Cl.
CPC .......... *B60W 10/119* (2013.01); *B60W 10/14* (2013.01); *B60W 30/188* (2013.01); *B60W 40/064* (2013.01); *B60W 40/068* (2013.01)

(56) References Cited

U.S. PATENT DOCUMENTS

| | | | |
|---|---|---|---|
| 2001/0029419 A1* | 10/2001 | Matsumoto | B60W 40/068 |
| | | | 701/80 |
| 2004/0186647 A1 | 9/2004 | Ono | |
| 2011/0118935 A1 | 5/2011 | Shiozawa et al. | |
| 2014/0172215 A1 | 6/2014 | Bartels et al. | |
| 2016/0023654 A1 | 1/2016 | Yamashita | |
| 2016/0368503 A1* | 12/2016 | Jonasson | B60R 16/023 |
| 2017/0369050 A1* | 12/2017 | Varnhagen | B60W 30/045 |

FOREIGN PATENT DOCUMENTS

| | | |
|---|---|---|
| JP | 5035418 B2 | 9/2012 |
| JP | 5793877 B2 | 10/2015 |

OTHER PUBLICATIONS

The extended European search report issued by the European Patent Office dated Nov. 19, 2019, which corresponds to European Patent Application No. 17867055.0-1012 and is related to U.S. Appl. No. 16/346,570.

International Preliminary Report on Patentability and Written Opinion issued in PCT/JP2017/039764; dated May 7, 2019.

* cited by examiner

DRIVING FORCE CONTROL METHOD AND SYSTEM FOR VEHICLE

TECHNICAL FIELD

The present invention relates to a driving force control method and system for a vehicle having a D-μ map which defines a substantially linear correlation between a driving stiffness and a maximum road surface μ (μ: friction coefficient).

BACKGROUND ART

Heretofore, there has been known a four-wheel drive vehicle designed to transmit a driving force from an engine, to one of a pair of front road wheels and a pair of rear road wheels, and distribute part of the transmitted driving force to a remaining one of the pair of front road wheels and the pair of rear road wheels via a driving force distribution mechanism such as an electronically-controlled coupling, while performing driving force distribution control to ensure adequate traveling characteristics.

The following Patent Document 1 discloses a control device for a four-wheel drive vehicle, wherein, in a situation where a slip ratio of a pair of main drive wheels detected by a slip ratio detection means is equal to or greater than a given value, the control device is operable, when a drive loss of the main drive wheels is determined to be greater than a drive loss of a pair of subordinate drive wheels and a drive loss caused by distribution of an output of a drive source to the subordinate drive wheels, to increase the distribution of the output to the subordinate drive wheels, and, when the drive loss of the main drive wheels is determined to be less than the drive loss of the subordinate drive wheels and the drive loss caused by the distribution of the output to the subordinate drive wheels, to reduce the distribution of the output to the subordinate drive wheels.

This allows the driving force to be distributed so as to minimize the total drive loss in the vehicle, thereby facilitating improvement in fuel economy.

With respect to each tire (road wheel), it is possible to set a tire characteristic graph defining, based on a tire model, a correlation between a slip ratio S and a driving force F, so-called "S-F characteristic graph".

In the S-F characteristic graph, when the slip ratio S is in the range of zero to around 0.1 (hereinafter be referred to as "small-slip region"), a linear characteristic is exhibited in which the driving force F increases in proportion to an increase in the slip ratio S, and, after the driving force F reaches a maximum driving force $F_{max}$, a non-linear characteristic is exhibited in which the driving force F gradually decreases with respect to the increase in the slip ratio S.

Here, a road surface μ during traveling can be estimated from a ratio between the slip ratio S and the driving force F (partial differential coefficient of the driving force F with respect to the slip ratio S), because the following relational formula is satisfied: $F=\mu \times W$, where μ denotes a friction coefficient between the tire and a road surface, and W denotes a ground contact load (vertical load) on the tire.

Particularly, in the small-slip region, it can be assumed that the slip ratio and the driving force (drive torque) are in the relationship of a linear function passing through the origin. Thus, a driving stiffness can be obtained by a ratio between the slip ratio and an actual torque of an engine as a drive source. By using the driving stiffness and the actual torque of the engine, a target slip ratio can be calculated, thereby facilitating higher-speed calculation processing.

The following Patent Document 2 discloses a control device for a four-wheel drive vehicle, wherein: a reference S-F characteristic graph defining a reference value of the slip ratio, the driving force and the road surface μ is prepared; after, on a coordinate plane defined by orthogonal axes representing the slip ratio and the driving force, drawing a straight line passing through a coordinate point of present values of the slip ratio and the driving force, and the origin of the coordinate plane, an intersection point between the reference S-F characteristic graph and the straight line is calculated; and a present value of the road surface μ is estimated through a product of a reference value of the road surface μ and a ratio of the present value of the driving force to a reference value of the driving force at the intersection point, or a product of the reference value of the road surface μ and a ratio of the present value of the slip ratio to a reference value of the slip ratio at the intersection point, although the control device is not designed to use the driving stiffness.

This makes it possible to calculate a present value of the road surface μ based on the slip ratio and the driving force during traveling, and execute driving force control based on the calculated road surface μ.

As one index of a grip limit (grip limit index) of a tire, there is the maximum driving force. Further, there has been known a friction circle using this maximum driving force.

Figure 10:
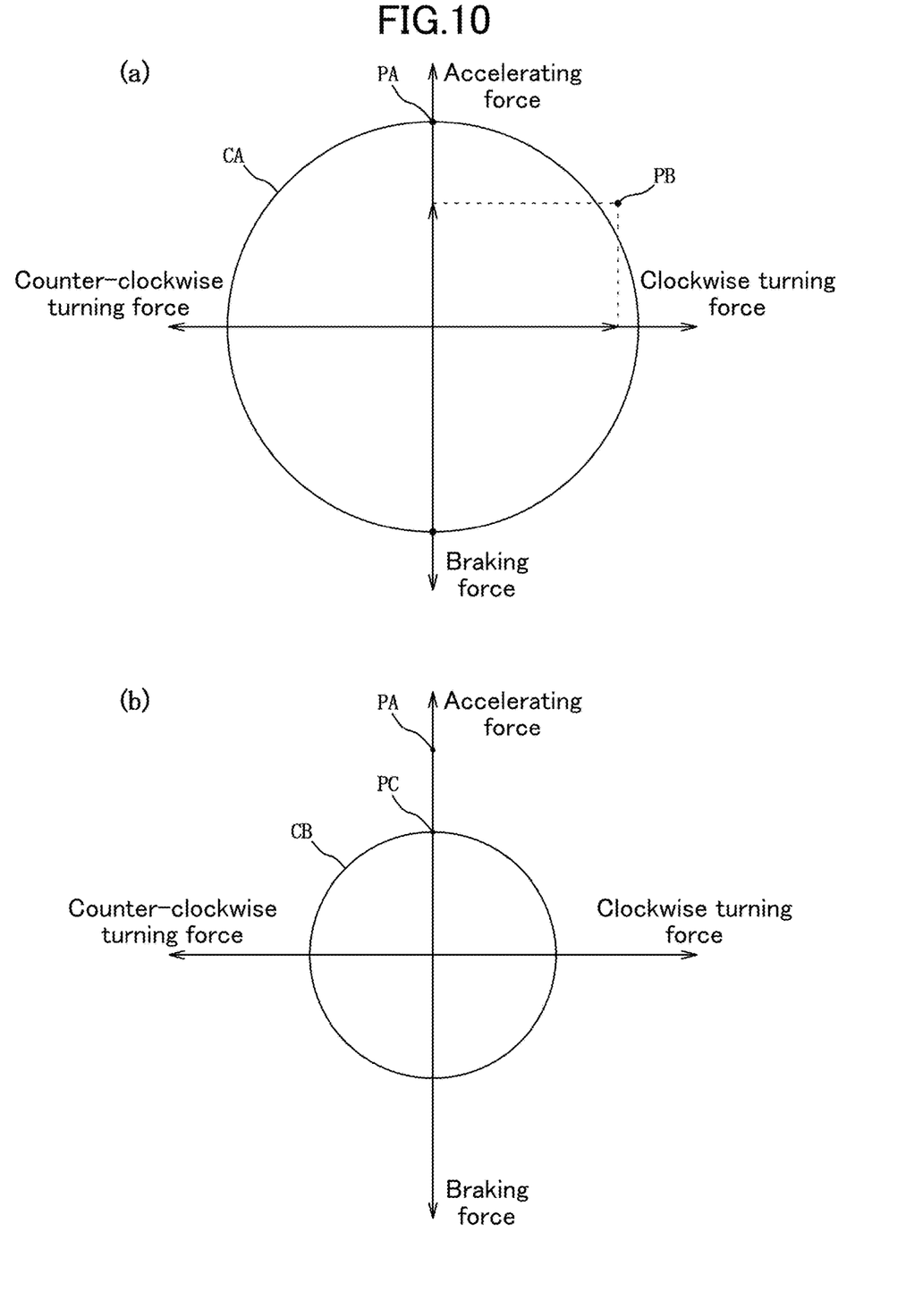
FIG. 10 is a diagram depicting a friction circle of two tires having the same specification, used in different road surface states, wherein the road surface states in charts (a) and (b) are, respectively, a dry state and a wet state.

As depicted in chart (a) of FIG. 10, in a tire, a friction force which is a resultant force of a longitudinal force (accelerating force and braking force) and a lateral force (counter-clockwise turning force and clockwise turning force) is used as a grip force against a road surface.

When a force acting on the tire exists within the friction circle CA as indicated by a point PA, a friction state of the tire against the road surface is stable. On the other hand, when a force deviating out of the friction circle CA occurs as indicated by a point PB, it goes beyond the limit of a friction force capable of being exerted against the road surface by the tire itself, so that the tire becomes unstable, resulting in the start of slip (theory of friction circle).

Further, a maximum friction force represented by the radius of the friction circle CA is basically proportional to a maximum road surface μ corresponding to the maximum driving force, and therefore varies depending on a road surface state, a tire state and the like.

Specifically, when a vehicle travels on a dry-state road surface, and a tire of the vehicle has a grip capacity corresponding to the friction circle CA as depicted in chart (a) of FIG. 10, the point PA exists within the friction circle CA. Thus, the vehicle can be accelerated at an acceleration corresponding to the point PA without occurrence of slip.

On the other hand, when the vehicle travels on a wet-state road surface, the grip capacity of the tire is changed such that it corresponds to a friction circle CB having a radius less than that of the friction circle CA, as depicted in chart (b) of FIG. 10. Thus, slip occurs even at the point PA at which no slip occurs in the friction circle CA, and the vehicle can be accelerated only at up to an acceleration corresponding to a point PC, without occurrence of slip.

CITATION LIST

Patent Document

Patent Document 1: JP 5793877B
Patent Document 2: JP 5035418B

SUMMARY OF INVENTION

Technical Problem

Conventionally, in principle, a four-wheel drive vehicle has been configured to determine a possibility of the occurrence of slip in a pair of main drive wheels, using a friction circle corresponding to a grip capacity of each tire of the main drive wheels, acquired experimentally or empirically, and, when a possibility that a force acting on the main drive wheel deviates out of the friction circle is determined, distribute part of a driving force from the main drive wheels to a pair of subordinate drive wheels.

In this way, a drive loss due to slip of the main drive wheels is reduced.

Here, in a case where, despite a margin in the grip capacity of each tire of the main drive wheels, the timing of the driving force distribution to the subordinate drive wheels is early, fuel economy is likely to undesirably deteriorate due to a drive loss due to slip of the subordinate drive wheels, mechanical loss of a drive-train relating to the driving force distribution to the subordinate drive wheels.

Therefore, by delaying the timing of the driving force distribution to the subordinate drive wheels as much as possible, while using a friction circle reliably reflecting the grip capacity of each tire of the main drive wheels, in the slip possibility determination.

However, it is not easy to acquire a friction circle reliably reflecting the grip capacity of each tire of the main drive wheels.

As mentioned above, the radius of a friction circle of a target tire is basically proportional to the maximum road surface $\mu$. Then, the maximum road surface $\mu$ with respect to the tire varies by a combination of: a road surface state, such as dry, wet, snowy or icy road surface; and at least one of a tire type (property), such as normal, all-season or studless, and, a tire state, such as tread groove depth or air pressure (internal pressure).

Although it is possible to possess a plurality of types of S-F characteristic graphs with respect to each combination of the road surface state and at least one of the tire type and the tire state so as to acquire a friction circle reliably reflecting the grip capacity of the tire, this approach is not realistic from the viewpoint of practicality.

The four-wheel drive vehicle control device disclosed in the Patent Document 2 is configured to calculate a road surface $\mu$ during traveling, based on detected values of the slip ratio and the driving force.

However, the technique described in the Patent Document 2 is configured, without focusing on driving stiffness, to draw, on the coordinate plane, a straight line passing through a coordinate point of present values of the slip ratio and the driving force, and the origin of the coordinate plane, and calculate an intersection point between the reference S-F characteristic graph and the straight line. Thus, it is physically difficult to estimate the road surface $\mu$ corresponding to a low slip-side region with respect to the intersection point, irrespective of a magnitude relationship of a present value of the road surface $\mu$ with respect to the road surface $\mu$ of the reference S-F characteristic graph.

That is, although it is possible to calculate the road surface $\mu$ in a region equal to or greater than the slip ratio corresponding to the maximum driving force, the maximum road surface $\mu$, it is difficult to calculate the maximum road surface $\mu$ which is most important in the driving force distribution.

Therefore, in order to achieve further improvement in fuel economy, it is necessary to establish a technique of calculating the maximum road surface $\mu$ with a high degree of accuracy, irrespective of traveling environments.

It is an object of the present invention to provide a vehicle driving force control method and system which are capable of controlling a driving force based on a maximum road surface $\mu$ calculated with a high degree of accuracy, irrespective of traveling environments or the like.

Solution to Technical Problem

According to a first aspect of the present invention, there is provided a driving force control method for a vehicle. The driving force control method comprises: a first step of preliminarily setting a D-$\mu$ map or a D-$\mu$ calculation formula defining a substantially linear correlation between a driving stiffness and a maximum road surface $\mu$; a second step of calculating a slip ratio of a target road wheel of the vehicle; a third step of calculating the driving stiffness corresponding to a value of the slip ratio calculated in the second step; a fourth step of assigning a value of the driving stiffness calculated in the third step to the D-$\mu$ map or the D-$\mu$ calculation formula to calculate the maximum road surface $\mu$; and a fifth step of controlling a driving force of the vehicle, using a value of the maximum road surface $\mu$ calculated in the fourth step.

The driving force control method according to the first aspect of the present invention comprises the first step of preliminarily setting a D-$\mu$ map or a D-$\mu$ calculation formula defining a substantially linear correlation between a driving stiffness and a maximum road surface $\mu$, so that it is possible to possess the correlation between the driving stiffness and the maximum road surface $\mu$, without requiring any complicated control processing.

The driving force control method further comprises the second step of calculating a slip ratio of a target road wheel of the vehicle, the third step of calculating the driving stiffness corresponding to a value of the slip ratio calculated in the second step, and the fourth step of assigning a value of the driving stiffness calculated in the third step to the D-$\mu$ map or the D-$\mu$ calculation formula to calculate the maximum road surface $\mu$, so that it is possible to calculate the maximum road surface $\mu$ through the driving stiffness, irrespective of traveling environments or the like.

The driving force control method further comprises the fifth step of controlling a driving force of the vehicle, using a value of the maximum road surface $\mu$ calculated in the fourth step, so that it is possible to control the driving force, using the maximum road surface $\mu$ reliably reflecting a grip capacity of the target road wheel and serving as a grip limit index.

Preferably, in the driving force control method of the present invention, the third step includes calculating the driving stiffness, using at least a value of the slip ratio which is equal to or less than one-half of a value of the slip ratio corresponding to the maximum road surface $\mu$.

According to this feature, it is possible to estimate the driving stiffness in the small-slip region which is most frequently used, and calculate the maximum road surface $\mu$ with a high degree of accuracy, immediately after the start of driving of the vehicle.

Preferably, in the driving force control method of the present invention, the correlation between the driving stiffness and the maximum road surface $\mu$ set in the step 1 is linear.

According to this feature, it is possible to calculate the maximum road surface μ with a high degree of accuracy by simple processing.

Preferably, in the driving force control method of the present invention, the vehicle comprises a drive source, and a driving force distribution device to distribute the driving force from the drive source between a pair of main drive wheels serving as the target road wheel and a pair of subordinate drive wheels, based on a grip limit index.

According to this feature, it is possible to delay the driving force distribution timing from the main drive wheels to the subordinate drive wheels as much as possible, and thus expect a significant improvement in fuel economy.

Preferably, in the driving force control method of the present invention, the fifth step includes setting a distribution ratio of the driving force between the main and subordinate drive wheels, using a ratio between a road surface μ during traveling and the maximum road surface μ.

According to this feature, it is possible to execute the driving force control, using the ratio between the present road surface μ and the maximum road surface μ serving as the grip limit index.

Preferably, in the driving force control method of the present invention, the fifth step includes setting a distribution ratio of the driving force between the main and subordinate drive wheels, using a friction circle defined by the driving force and a lateral force.

According to this feature, it is possible to execute the driving force control, using the friction circle defined by the maximum driving force serving as a grip limit index.

According to a second aspect of the present invention, there is provided a driving force control system for a vehicle. The driving force control system comprises: a storage circuit to store a D-μ map or a D-μ calculation formula defining a substantially linear correlation between a driving stiffness and a maximum road surface μ; a slip ratio calculation circuit to calculate a slip ratio of a target road wheel of the vehicle; a driving stiffness calculation circuit to calculate the driving stiffness corresponding to a value of the slip ratio calculated by the slip ratio calculation circuit; a maximum road surface μ calculation circuit to assign a value of the driving stiffness calculated by the driving stiffness calculation circuit to the D-μ map or the D-μ calculation formula to calculate the maximum road surface u; and a driving force control circuit to control a driving force of the vehicle, using a value of the maximum road surface μ calculated by the maximum road surface μ calculation circuit.

The driving force control system can bring out basically the same advantageous effect of the invention set forth in the appended claim 1.

Effect of Invention

The vehicle driving force control method and system of the present invention are capable of controlling the driving force based on the maximum road surface calculated with a high degree of accuracy, irrespective of traveling environments or the like.

DESCRIPTION OF EMBODIMENTS

With reference to the drawings, the present invention will now be described based on an embodiment thereof.

The following description will be made based on an example in which a driving force control system 1 of the present invention is applied to a four-wheel drive vehicle, but is not intended to restrict a technical scope of the present invention, and an application target or intended purpose of the present invention.

First Embodiment

With reference to FIGS. 1 to 9, a driving force control system according to one embodiment of the present invention will be described below.

A vehicle V equipped with a driving force control system 1 according to this embodiment is a front-engine front-wheel drive (FF)-based four-wheel drive vehicle.

More specifically, the driving force control system 1 is configured to be capable of appropriately switching between a two-wheel drive state and a four-wheel drive state, instead of implementing "full-time four-wheel drive.

Further, this vehicle V is configured such that the aftermentioned front road wheels 10L, 10R are steerable according to manipulation of a steering wheel (depiction is omitted).

First of all, the prerequisite structure of the vehicle V will be described.

Figure 1:
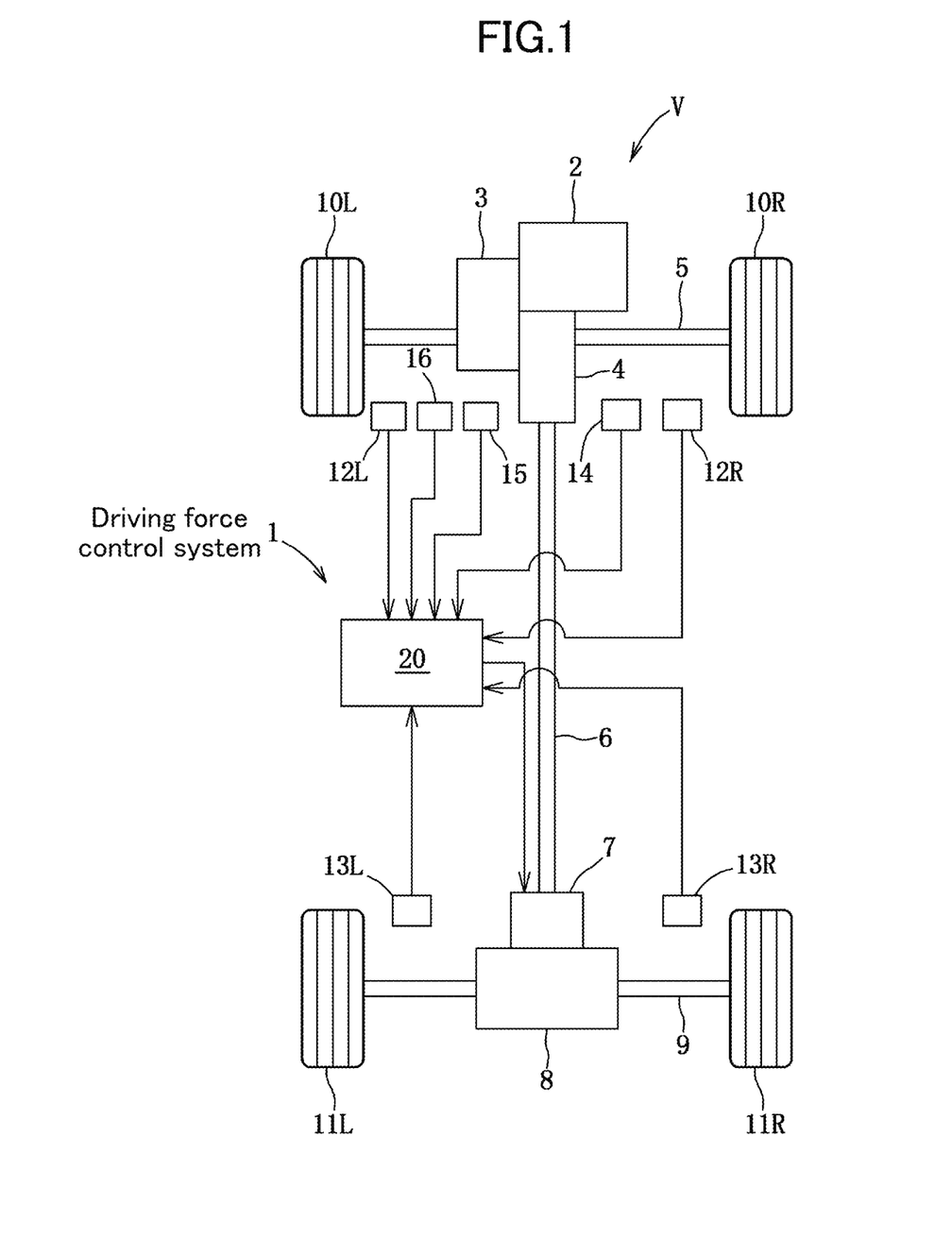
FIG. 1 is a general configuration diagram schematically depicting a vehicle employing a driving force control system according to an embodiment of the present invention.

As depicted in FIG. 1, the vehicle V comprises an engine 2, a transmission 3, a PTO (Power Take-Off) 4, a front drive shaft 5, a propeller shaft 6, an electromagnetic coupling (driving force distribution device) 7, a rear differential gear unit 8, a rear drive shaft 9, a pair of left and right front road wheels 10L, 10R each serving as a main drive wheel, a pair of left and right rear road wheels 11L, 11R serving as subordinate drive wheels, a pair of front road wheel speed sensors 12L, 12R, a pair of rear road wheel speed sensors 13L, 13R, an accelerator sensor 14, an engine speed sensor 15, a speed change ratio sensor 16, and an ECU (Electronic Control Unit) 20.

The engine 3 is operable to combust a mixture of fuel and air to generate an engine torque as propelling power for the vehicle V, and transmit the generated engine torque to the transmission 3.

The transmission 3 is configured to change a gear ratio among a plurality of stages, and operable to transmit the engine torque output from the engine 2 at a currently-set one of the gear ratios. In this process, the transmission 3 is operable to convert the engine torque from the engine 2, into a driving force, and transmit the driving force to the front road wheels 10L, 10R, and the PTO 4 equivalent to a transfer gear unit, via the front drive shaft 5.

The PTO 4 is operable to transmit a part of the driving force from the transmission 3, to the propeller shaft 6, and then the propeller shaft 6 is operable to transmit the driving force from the PTO 4, to the electromagnetic coupling 7.

The electromagnetic coupling 7 is operable to transmit the driving force from the propeller shaft 6, to the rear differential gear unit 8, and then the rear differential gear unit 8 is operable to transmit and distribute the driving force from the electromagnetic coupling 7, to the rear road wheels 11L, 11R via the rear drive shaft 9.

The electromagnetic coupling 7 is a coupling device for coupling the propeller shaft 6 and a shaft connecting to the rear differential gear unit 8, together, and comprises an electromagnetic coil, a cam mechanism and a clutch (depiction of these components is omitted). The electromagnetic coupling 7 is configured such that an engagement force thereof can be variably changed according to a current which is supplied to the electromagnetic coil based on an instruction signal from the ECU 20.

The electromagnetic coupling 7 is operable to change a restraint rate h corresponding to the engagement force to thereby change a maximum transmission torque which is a maximum value of the driving force to be transmitted to the rear differential gear unit 8, i.e., the driving force to be transmitted to the rear road wheels 11L, 11R, among the driving force from the propeller shaft 6.

The front road wheel speed sensor 12L is operable to detect a road wheel speed of the front road wheel 10L, and the front road wheel speed sensor 12R is operable to detect a road wheel speed of the front road wheel 10R. The rear road wheel speed sensor 13L is operable to detect a road wheel speed of the rear road wheel 11L, and the rear road wheel speed sensor 13R is operable to detect a road wheel speed of the rear road wheel 11R.

The accelerator sensor 14 is operable to detect a relative accelerator position corresponding to an amount of manipulation of an accelerator pedal (depiction is omitted) by a driver, and the engine speed sensor 15 is operable to detect a rotational speed of a crankshaft (depiction is omitted) of the engine 2.

The speed change ratio sensor 16 is operable to detect a speed change ratio of the transmission 3. In a case where the transmission 3 is an automatic transmission, the speed change ratio sensor 16 is configured to detect a ratio between respective rotational speeds at input and output ends of the transmission 3. On the other hand, in a case where the transmission 3 is a manual transmission, the speed change ratio sensor 16 is configured to detect the position of a shift lever (depiction is omitted).

Each of these sensors 12L, 12R, 13L, 13R, 14 to 16 is operable to output a detection signal detected thereby to the ECU 20.

The ECU 20 comprises a CPU (Central Processing Unit), a ROM, a RAM, an input-side interface, and an output-side interface.

The ROM stores therein various programs and data for performing driving force control processing, and the RAM has a processing area to be used when the CPU performs a series of processing.

Next, the driving force control system 1 will be described.

The driving force control system 1 is configured to distribute a part of the driving force F to the rear road wheels 11L, 11R serving as subordinate drive wheels, according to the possibility of slip determined based on the maximum road surface $\mu$ (grip limit index) of one of the front road wheels 10L, 10R serving as main drive wheels, wherein the one front road wheel (target road wheel) has a larger slip ratio S than the other front road wheel.

This driving force control system 1 is comprised of the electromagnetic coupling 7, the sensors 12R, 12R, 13L, 13R, 14 to 16, and the ECU 20.

Here, note that the following description contains a description about a driving force control method for the vehicle.

Figure 2:
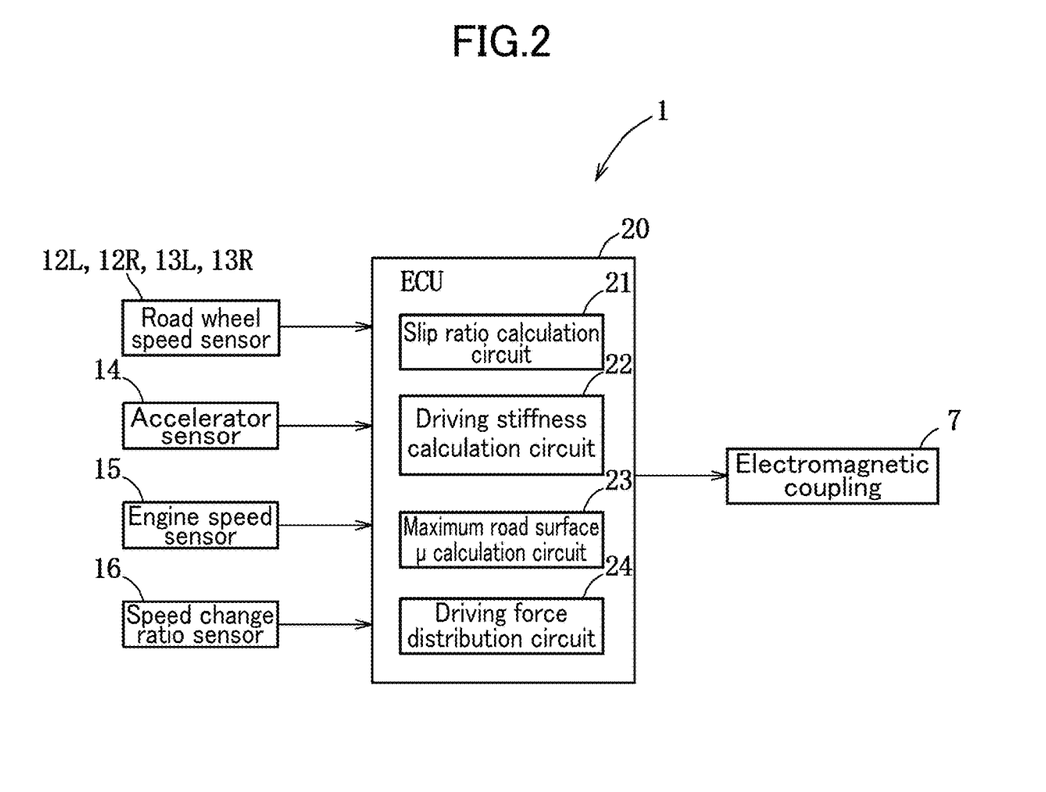
FIG. 2 is a block diagram of the driving force control system.

As depicted in FIG. 2, the ECU 20 comprises a slip ratio calculation circuit 21, a driving stiffness calculation circuit 22, a maximum road surface $\mu$ calculation circuit 23, and a driving force distribution circuit 24 (corresponding to the driving force control circuit). The ECU 20 is operable to calculate the engine torque output from the engine 2, based on the relative accelerator position and the engine speed. Then, the ECU 20 is operable, based on the engine torque and the speed change ratio, to calculate the driving force F to be transmitted from the front road wheels 10L, 10R to the road surface. Further, the ECU 20 includes a storage circuit (memory), which is not shown, to store a D-$\mu$ map or a D-$\mu$ calculation formula.

Firstly, the slip ratio calculation circuit 21 is operable, based on detection signals of the sensors 12R, 12R, 13L, 13R, to calculate the slip ratio of each of the front road wheels 10L, 10R.

More specifically, the slip ratio calculation circuit 21 is operable to calculate a pseudo-slip ratio SFL and a pseudo-slip ratio SFR, respectively, by dividing a difference value between the road wheel speed VFL of the front road wheel 10L and a vehicle speed VB by the vehicle speed VB, and by dividing a difference value between the road wheel speed VFR of the front road wheel 10R and the vehicle speed VB by the vehicle speed VB, and set a larger one of the calculated pseudo-slip ratios SFL, SFR as the slip ratio S representing the pseudo-slip ratios of the front road wheels 10L, 10R.

In this embodiment, a lower one of the road wheel speeds VRL, VRR of the rear road wheels 11L, 11R serving as subordinate drive wheels is used as the vehicle speed VB.

Alternatively, the vehicle speed may be calculated based on the rotation speed of an output shaft of the transmission 3, or may be obtained by integrating the acceleration of the vehicle V.

Secondly, the driving stiffness calculation circuit 22 will be described.

The driving stiffness calculation circuit (hereinafter abbreviated as "DS calculation circuit") 22 is operable to calculate a driving stiffness D corresponding to a value of the slip ratio S calculated by the slip ratio calculation circuit 21.

Figure 3:
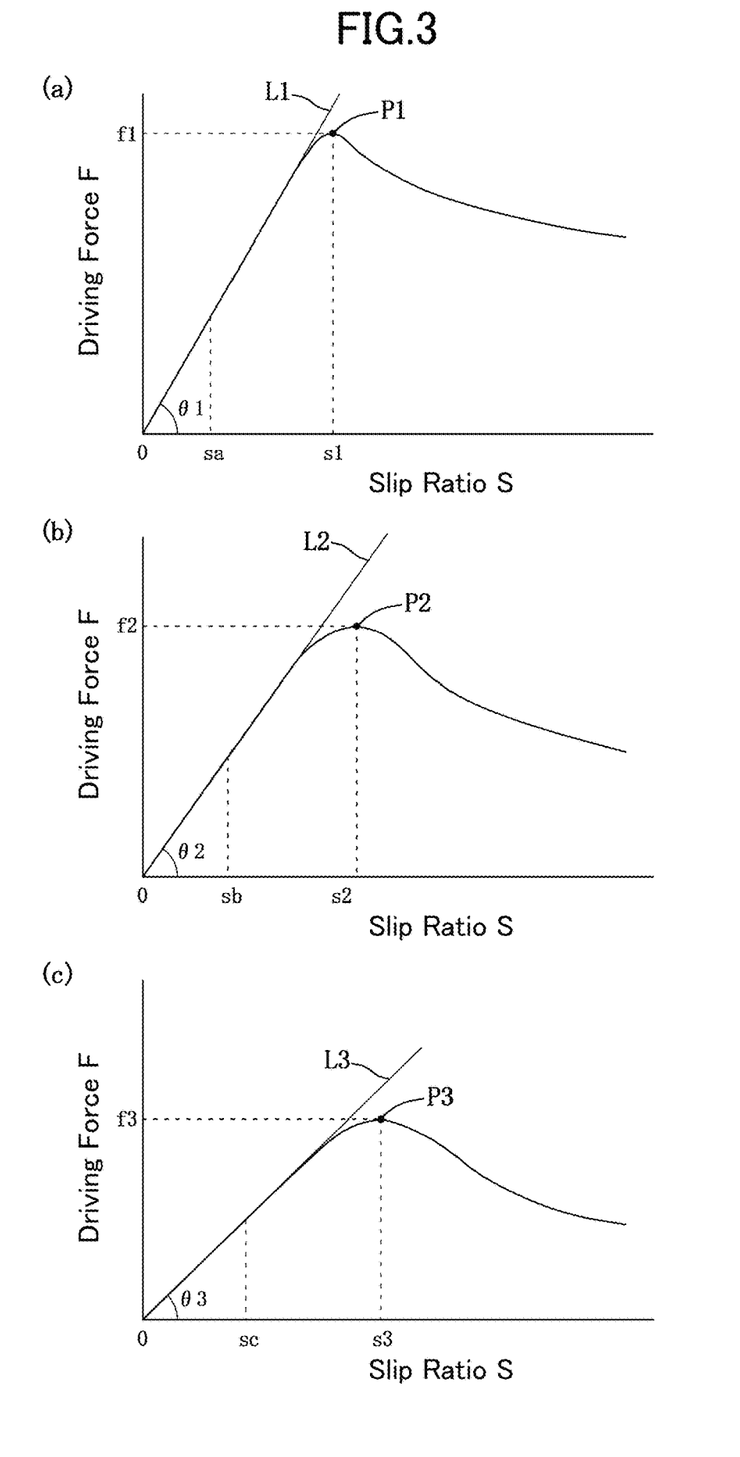
FIG. 3 is a S-F characteristic graph of a tire having a given same specification, obtained when the tire is used in three different road surface states, wherein the road surface states in charts (a), (b) and (c) are, respectively, a dry state, a wet state and a snowy state.

The driving stiffness D is expressed by a ratio of the driving force F of the target road wheel to the slip ratio S of the target road wheel, in a small-slip region of an S-F characteristic graph, i.e., by a gradient of a linear function on the S-F characteristic graph.

Here, the S-F characteristic graph will be briefly described.

The S-F characteristic graph indicates a characteristic of change in the driving force F acting between a road wheel and a road surface, with respect to the slip ratio S of the road wheel (tire), during acceleration and braking of a vehicle.

As presented in FIG. 3, when a road wheel is used in different road surface states even if the road wheel is equipped with a tire having a given specification (type, properties, state, etc.), a characteristic of the S-F characteristic graph will vary.

Here, when the slip ratio S is zero, the road wheel is in a free rolling state, and, when the slip ratio S is 1.0 (100%), the road wheel is in a locked state.

As presented in chart (a) of FIG. 3, at a peak P1 appearing when the road surface is in a dry state, the slip ratio S is s1 (around 0.1), and the maximum driving force is f1.

Thus, the following formula (1) is satisfied, where μ denotes a friction coefficient between the road wheel and the road surface, and W denotes a ground contact load of the road wheel.

$$F=\mu \times W \quad (1)$$

Therefore, a road surface μ during traveling can be calculated by assigning the driving force F and the ground contact load W to the formula (1). Thus, a maximum road surface μ1 at the peak P1 can be obtained by assigning the maximum driving force f1 as limit performance of the target road wheel and the ground contact load W to the formula (1).

Further, in the small-slip region where the slip ratio is from zero to s1, the slip ratio S and the driving force F exhibit a linear function L1 having a gradient of θ1.

As presented in chart (b) of FIG. 3, at a peak P2 appearing when the road surface is in a wet state, the slip ratio is s2 (s1<s2), and the maximum driving force is f2 (f2<f1). Further, the maximum road surface μ is μ2 (μ2<μ1), and the gradient of a linear function L2 is θ2 (θ2<θ1).

Similarly, as presented in chart (c) of FIG. 3, at a peak P3 appearing when the road surface is in a snowy state, the slip ratio is s3 (s2<s3), and the maximum driving force is f3 (f3<f2). Further, the maximum road surface μ is μ3 (μ3<μ2), and the gradient of a linear function L3 is θ3 (θ3<θ2).

Return to the description about the DS calculation circuit 22.

The DS calculation circuit 22 is operable to calculate a straight line (linear function formula) connecting a coordinate point defined by a certain value of the slip ratio S and a value of the driving force F corresponding to the certain value of the slip ratio S and the coordinate origin, and calculate the driving stiffness D based on the gradient of the calculated straight line, using the following formula (2).

$$D=F/S \quad (2)$$

Figure 4:
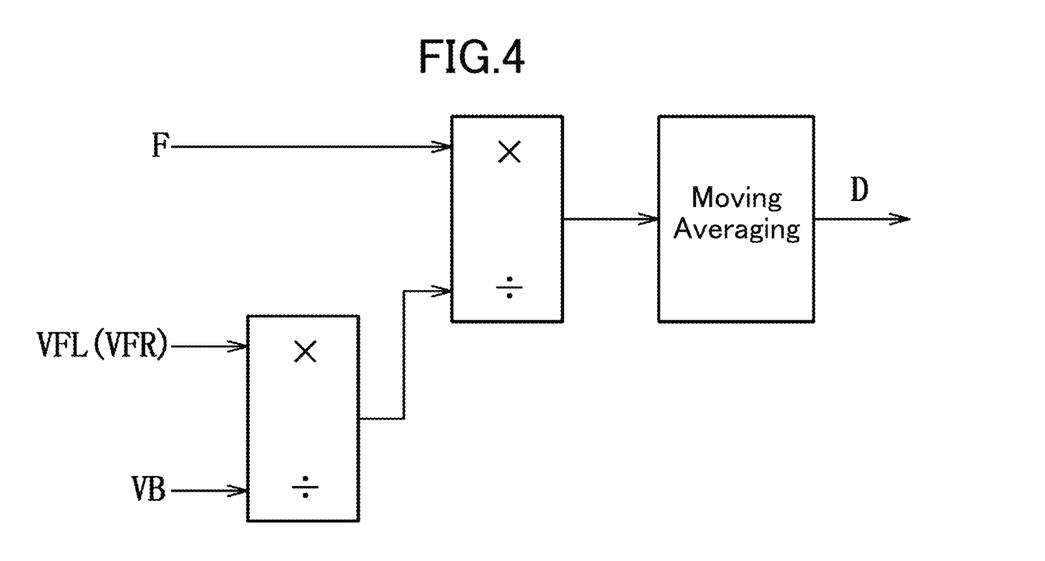
FIG. 4 is a block diagram of a DS calculation circuit.

More specifically, as depicted in FIG. 4, the DS calculation circuit 22 is configured to derive the driving stiffness D from a moving average obtained by the formula (2), in a region where the slip ratio S is equal to or less than one-half of a value thereof corresponding to the maximum road surface μ (e.g., in a region where is the slip ratio S is around 0.03).

Further, the DS calculation circuit 22 is operable to calculate a present value of the road surface μ, using the formula (1).

Thirdly, the maximum road surface μ calculation circuit 23 will be described.

Figure 7:
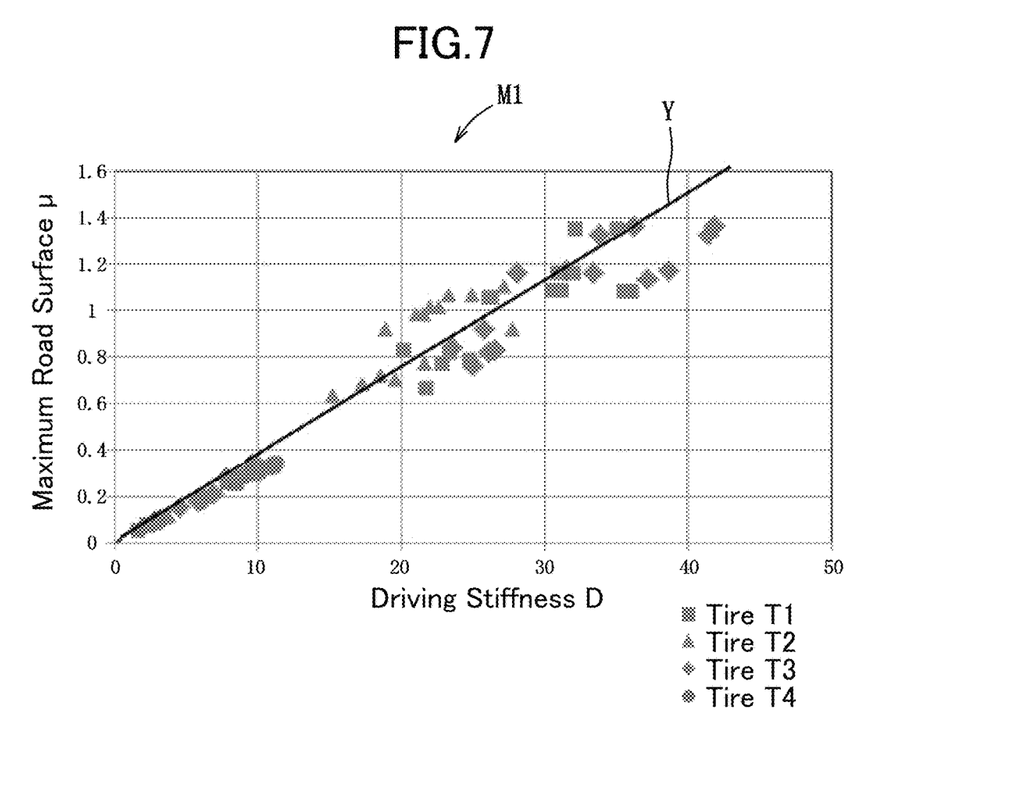
FIG. 7 is a D-μ map.

The maximum road surface μ calculation circuit 23 is operable to assign the driving stiffness D calculated by the DS calculation circuit 22 to a driving stiffness-maximum road surface μ map (hereinafter referred to as "D-μ map") M1 to thereby calculate the maximum road surface μ.

Here, the D-μ map M1 will be described.

As presented in FIG. 7, the D-μ map M1 is a map defining a substantially linear correlation between the driving stiffness D and the maximum road surface μ.

As mentioned above, even in a road wheel equipped with a tire having a given specification, the S-F characteristic graph varies, i.e., the maximum road surface μ varies, depending on the road surface state.

Figure 5:
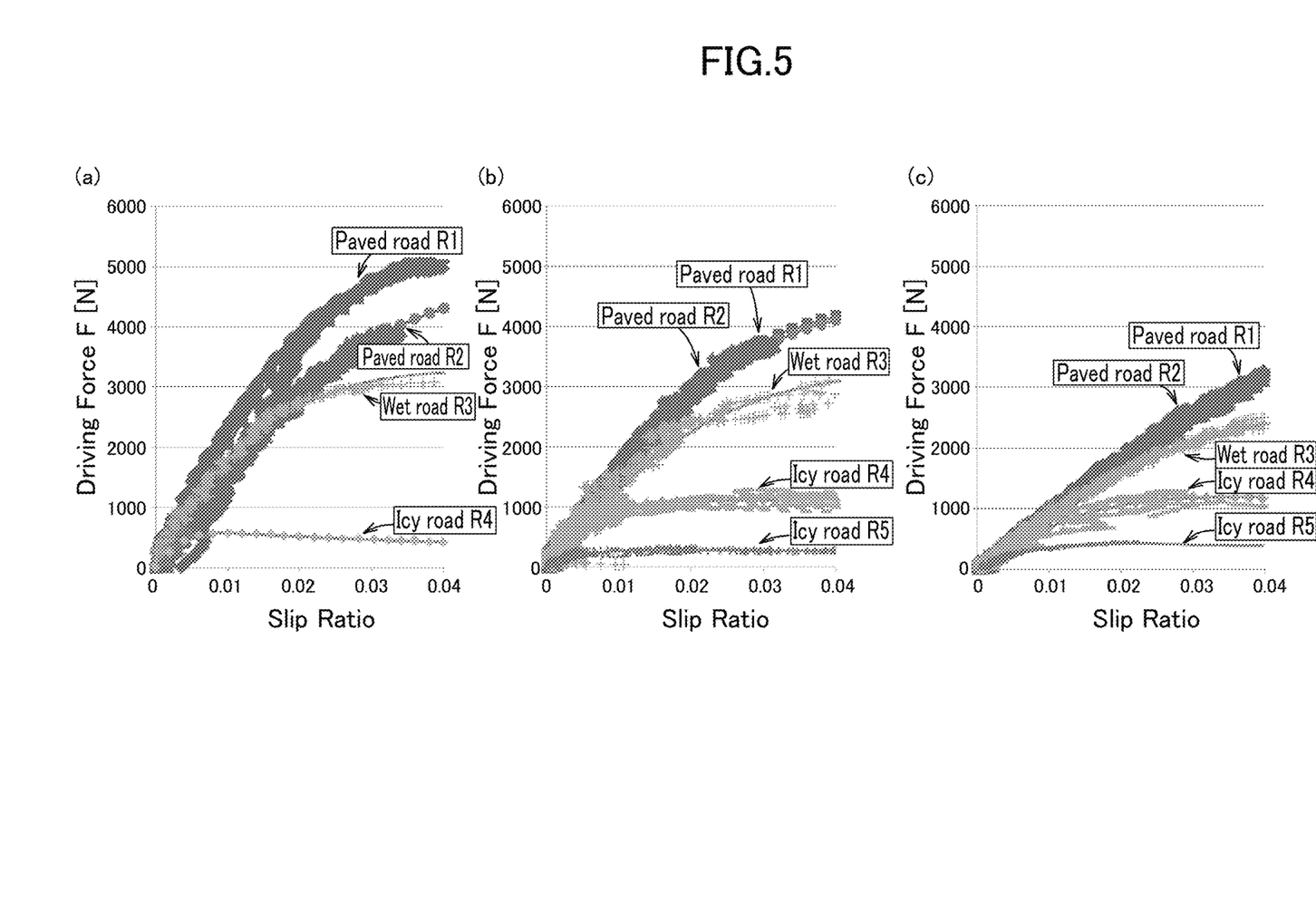
FIG. 5 is an enlarged view of small-slip regions in respective S-F characteristic graphs of three different types of tires, obtained when each of the tires is used in various road surface states, wherein the tires in charts (a), (b) and (c) are, respectively, a normal tire, an all-season tire and a studless tire.

Chart (a) in FIG. 5 is an S-F characteristic graph of a normal tire, and charts (b) and (c) in FIG. 5 are, respectively, an S-F characteristic graph of an all-season tire and an S-F characteristic graph of a studless tire.

As presented in FIG. 5, even in the same tire type, depending on whether the road surface state is in the dry state (concrete road, asphalt road), or in the wet state, or in the icy state, the driving stiffness D varies, and thus the maximum road surface μ varies.

On the other hand, even under the same road surface state, depending on the tire type (normal, all-season, studless, etc.) or the tire state (air pressure, aging (tread groove depth), etc.), the driving stiffness D and the maximum road surface μ vary.

Therefore, in order to detecting a correlation between the road wheel and the road surface, which is free of the influence of tire types T1 to T5, road surface states R1 to R5 and tire states, a verification experiment was performed.

Conditions of the verification experiment will be described.

A relationship between a front road wheel speed and a rear road wheel speed is equivalent to a coupling step ratio of the electromagnetic coupling 7. Thus, an experimental vehicle capable of fixing the coupling slip ratio to a given value to maintain a slip ratio of front road wheels at a constant value (e.g., 4%) was prepared.

After attaching each of a set of normal tires (summer tiers), a set of all-season tires, a set of studless tires and a set of 45 aspect ratio tires to the experimental vehicle, the driving stiffness D and the maximum road surface μ were measured in a situation where the ground contact load W, the air pressure and the road state were changed.

Figure 6:
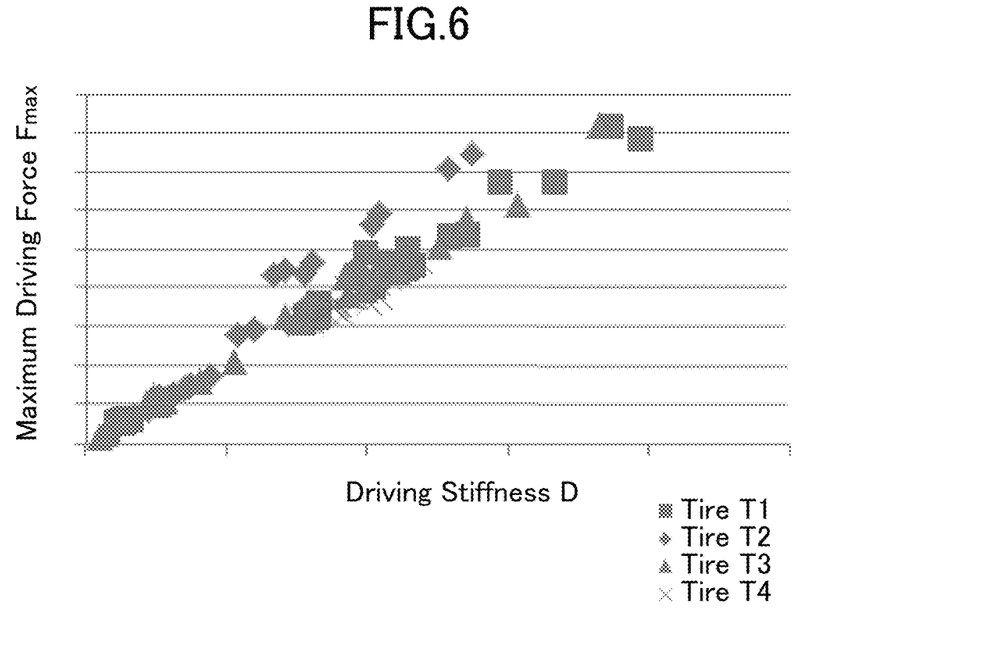
FIG. 6 is a graph presenting a correlation between a driving stiffness and a maximum driving force.

FIG. 6 presents a result of the verification experiment.

As presented in FIG. 6, a substantially linear correlation was found between the driving stiffness D and the maximum road surface μ.

Specifically, when the ground contact load W is constant, there is a proportional relationship between the maximum driving force $F_{max}$ and the maximum road surface μ, as seen in the formula (1). Thus, from this verification experiment, it was ascertained that there is a universalistic linear correlation between the driving stiffness D and the maximum road surface μ, irrespective of a difference in road surface state, and tire type in terms of tread rigidity or compound performance (see FIG. 7).

As presented in FIG. 7, based on the above verification experiment or the line, the D-μ map M1 is created as a linear function in which values falling within ±15% are converted to a given regression line Y through a given processing method (e.g., least-square method), and then preliminarily stored in the ECU 20.

Fourthly, the driving force distribution circuit 24 will be described.

The driving force distribution circuit 24 is operable to control respective driving forces of the front road wheels 10L, 10R and the rear road wheels 11L, 11R, using the maximum road surface $\mu$ calculated through the D-$\mu$ map M1 by the maximum road surface $\mu$ calculation circuit 23.

Figure 8:
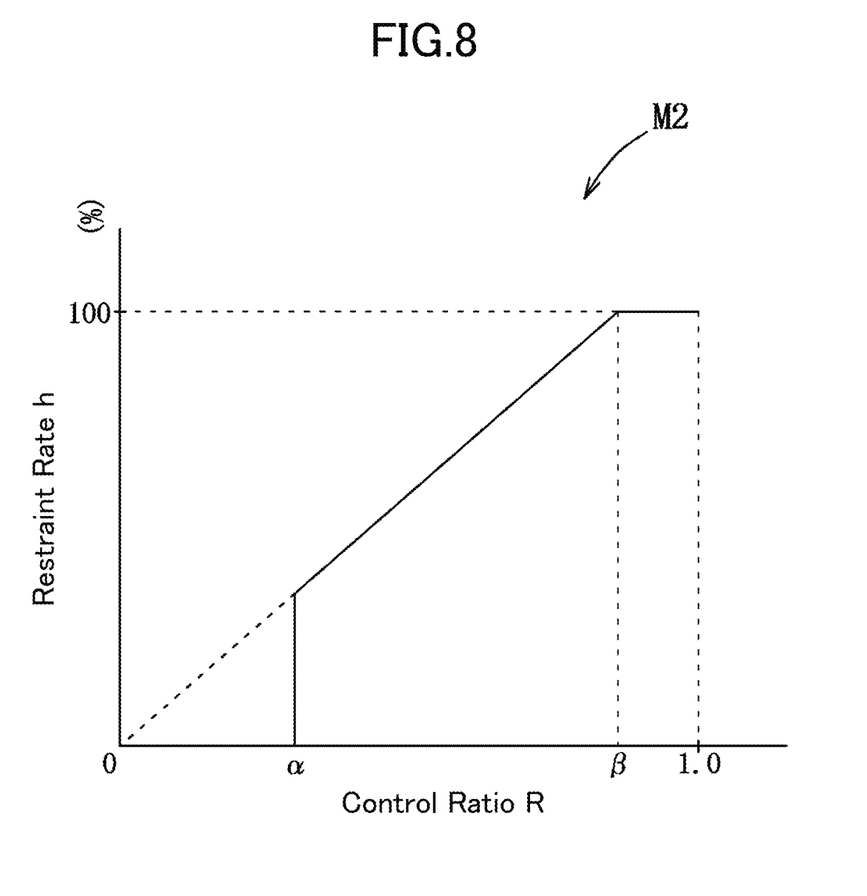
FIG. 8 is an electromagnetic coupling engagement force control map.

Specifically, the driving force distribution circuit 24 is operable to set the restraint rate h based on an engagement force control map M2 preliminarily stored in the ECU 20, and output the set restraint rate h to the electromagnetic coupling 7.

As presented in FIG. 8, the engagement force control map M2 is defined by the horizontal axis representing a control ratio (present road surface $\mu$/maximum road surface $\mu$) R of the present road surface $\mu$ to the maximum road surface $\mu$, and the vertical axis representing the restraint rate h.

A region where the control ratio R is from the origin to a threshold $\alpha$ (e.g., 0.3) is set as a dead zone. This is because, in this region, two-wheel drive by the front road wheels 10L, 10R can enhance fuel efficiency, as compared to distributing the driving force to the rear road wheels 11L, 11R.

In a region where the control ratio R is from the threshold $\alpha$ to a threshold $\beta$ (e.g., 0.8), the restraint rate h is constantly increased in proportion to the control ratio R until the electromagnetic coupling 7 is fully engaged (the restraint rate h becomes 100%). This is intended to reduce a drive loss due to slip of the front road wheels 10L, 10R by driving the rear road wheels 11L, 11R.

In a region where the control ratio R is from the threshold $\beta$ to 1, the electromagnetic coupling 7 is maintained in a fully-engaged state (the restraint rate h is maintained at 100%). This is because, in this region, four-wheel drive can enhance fuel efficiency, as compared to two-wheel drive.

Next, based on the flowchart in FIG. 9, a process of driving force distribution control processing will be described. Here, Si (i=1, 2, - - - ) denotes each step of the process. In this driving force distribution control processing, distribution control is performed in a cycle period of, e.g., 100 msec, after startup of the engine 2.

Figure 9:
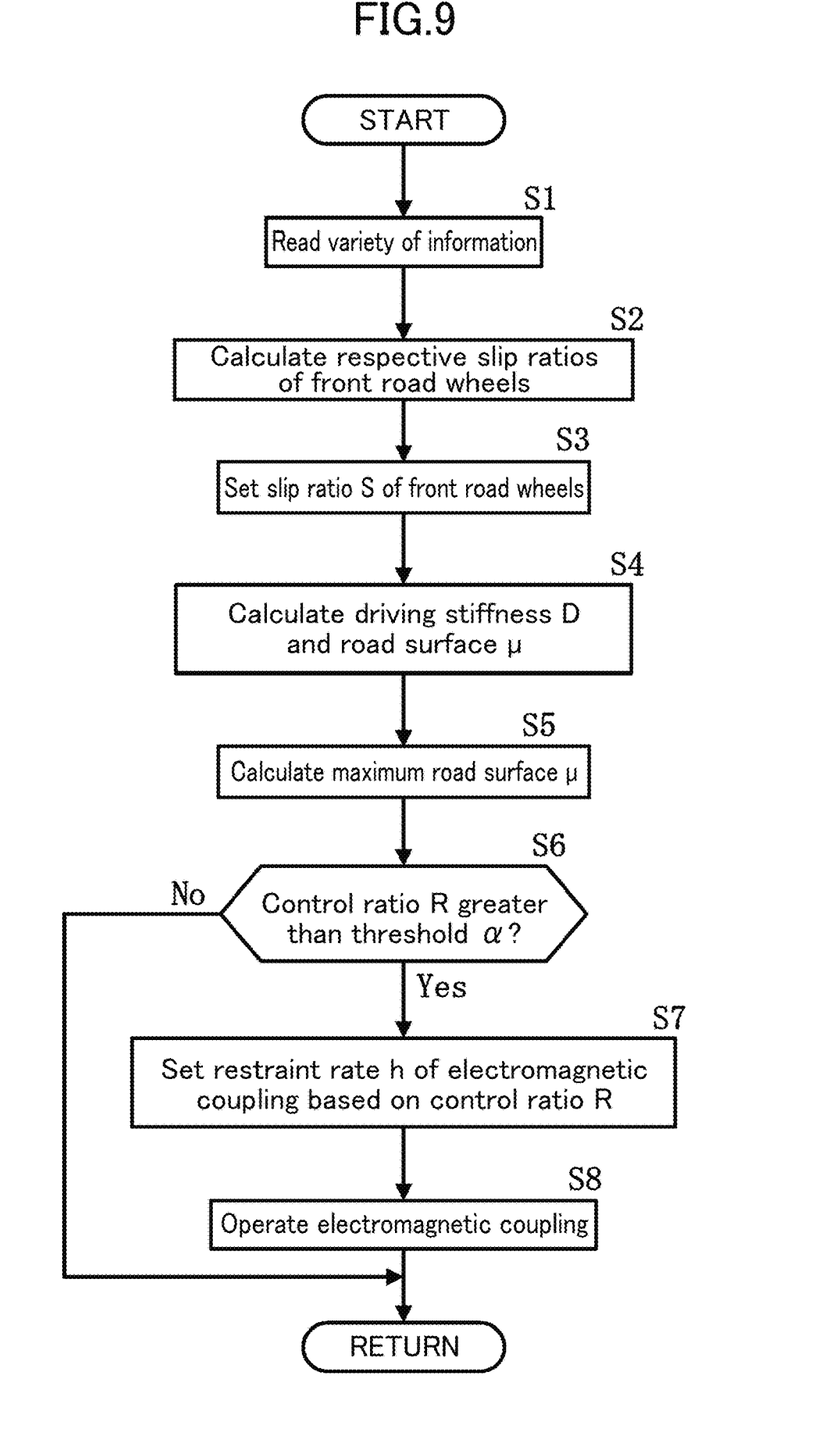
FIG. 9 is a flowchart presenting a process of driving force distribution control processing.

As presented in the flowchart of FIG. 9, in the driving force distribution control processing, first of all, in S1, a variety of information including detection values of the sensors, and the D-$\mu$ map M1 and the engagement force control map M2 stored in the EDU 20 is read. Then, the processing routine moves to S2.

In the S2, pseudo-slip ratios SFL, SFR are calculated as the front road wheels 10L, 10R. Then, the processing routine moves to S3.

In the S3, a larger one of the pseudo-slip ratios SFL, SFR is set as the slip ratio S representing the pseudo-slip ratios of the front road wheels 10L, 10R. Then, the processing routine moves to S4.

In the S4, the driving stiffness D is calculated based on the slip ratio S set in the S3 and the driving force F, and a present value of the road surface $\mu$ corresponding to a set value of the slip ratio S is calculated. Then, the processing routine moves to S5.

In the S5, the maximum road surface $\mu$ is calculated based on the driving stiffness D and the D-$\mu$ map M1. Then, the processing routine moves to S6.

In the S6, it is determined whether the control ratio R is greater than the threshold $\alpha$.

As a result of the determination in the S6, when the control ratio R is greater than the threshold $\alpha$, the processing routine moves to S7 to reduce the drive loss due to slip of the front road wheels 10L, 10R, by means of driving of the rear road wheels 11L, 11R.

In the S7, the restraint rate h is set based on the control ratio R and the engagement force control map M2. Then, after operating the electromagnetic coupling 7 according to a set value of the restraint rate h (S8), the processing routine returns to the S1.

As a result of the determination in the S6, when the control ratio R is equal to or less than the threshold $\alpha$, two-wheel drive can enhance fuel efficiency, as compared to distributing the driving force to the rear road wheels 11L, 11R. Thus, the processing routine returns to the S1.

Next, functions/advantageous effects of the driving force control system 1 according to this embodiment will be described.

The driving force control system 1 comprises the D-$\mu$ map defining a substantially linear correlation between the driving stiffness and the maximum road surface $\mu$, so that it is possible to possess the correlation between the driving stiffness and the maximum road surface $\mu$, without requiring any complicated control processing.

The driving force control system 1 further comprises: the slip ratio calculation circuit 21 for calculating a larger one of the slip ratios S of the front road wheels 10L, 10R, i.e., for calculating the slip ratio S of a target road wheel; the DS calculation circuit 22 for calculating the driving stiffness D corresponding to a value of the slip ratio calculated by the slip ratio calculation circuit 21; and the maximum road surface $\mu$ calculation circuit 23 for assigning a value of the driving stiffness D calculated by the DS calculation circuit 22 to the D-$\mu$ map to calculate the maximum road surface $\mu$, so that it is possible to calculate the maximum road surface $\mu$ through the driving stiffness D, irrespective of traveling environments or the like. The driving force control system 1 further comprises the driving force distribution circuit 24 for controlling the restraint rate h of the electromagnetic coupling 7, using a value of the maximum road surface $\mu$ calculated by the maximum road surface $\mu$ calculation circuit 23, so that it is possible to control the driving force, using the maximum road surface $\mu$ reliably reflecting a grip capacity of one of the front road wheels 10L, 10R and serving as a grip limit index.

The driving stiffness D is calculated by the DS calculation circuit 22, using at least a value of the slip ratio S which is equal to or less than one-half of a value of the slip ratio S corresponding to the maximum road surface $\mu$, so that it is possible to estimate the driving stiffness D in the small-slip region which is most frequently used, and calculate the maximum road surface $\mu$ with a high degree of accuracy, immediately after the start of driving of the vehicle.

The correlation between the driving stiffness and the maximum road surface $\mu$ set in the step 1, set in the D-$\mu$ map M1, is linear, so that it is possible to calculate the maximum road surface $\mu$ with a high degree of accuracy by simple processing.

The vehicle V comprises the engine 2, and the electromagnetic coupling 7 operable to distribute the driving force from the engine 2 between the front road wheels 10L, 10R one of which serves as the target road wheel, and the rear road wheels 11L, 11R, based on a grip limit index, so that it is possible to delay a driving force distribution timing from the front road wheels 10L, 10R to the rear road wheels 11L, 11R as much as possible, and thus expect a significant improvement in fuel economy.

The driving force distribution circuit 24 is operable to set a distribution ratio of the driving force between the front road wheels 10L, 10R and the rear road wheels 11L, 11R, using the control ratio, so that it is possible to execute the driving force control, using the control ratio R, i.e., the ratio of the present road surface $\mu$ to the maximum road surface $\mu$ serving as the grip limit index.

Next, some modifications obtained by partially modifying the above embodiment will be described.

(1) Although the above embodiment has been described based on an example where main drive wheels are front road wheels, and subordinate drive wheels are rear road wheels, the main drive wheels may be rear road wheels, and the subordinate drive wheels may be front rear road wheels.

Further, although the above embodiment has been described based on an example where the ratio of the driving force for the main drive wheels to the driving force for the subordinate drive wheels is 100:0 when the restraint rate is 0%, and 50:50 when the restraint rate is 100%, a reference driving force distribution ratio may be set to, e.g., 7:3. In this case, the reference driving force distribution ratio is subjected to correction based on the ratio R of the present road surface μ to the maximum road surface μ.

(2) Although the above embodiment has been described based on an example where the driving force control is performed using the control ratio of the present road surface μ to the maximum road surface μ, the driving force control may be performed using the maximum driving force serving as the grip limit index.

Specifically, the possibility of slip of the main drive wheels is estimated using a friction circle defined by the maximum driving force and a lateral force, and the driving force to be distributed to the subordinate drive wheels is set based on a relationship between the present road surface μ to the maximum road surface μ. In this way, the driving force control can be executed using the friction circle defined by the maximum driving force serving as the grip limit index.

(3) Although the above embodiment has been described based on an example where a correlation between the driving stiffness and the maximum road surface μ is possessed in the form of the D-μ map M1, the driving force control system may possess the correlation in the form of a D-μ calculation formula as a calculation formula of a linear function.

Further, although the above embodiment has been described based on an example where a dead zone is set in a first-half region of the engagement force control map, the engagement force control map may be set to have a linear line from the origin to 100% (fully-engaged state), without any dead zone.

(4) Although the above embodiment has been described based on an example where a drive mode is switched from two-wheel drive to four-wheel drive through the coupling depending on a traveling condition, the present invention may be applied to a full-time 4WD system or a part-time 4WD system. Further, the present invention may be applied to a traction control system.

(5) It is apparent to a person of ordinary skill in the art that various other changes and modifications may be made in the above embodiment without departing from the spirit and scope thereof as set forth in appended claims, and such changes and modifications should be construed as being included therein.

LIST OF REFERENCE SIGNS

1 driving force control system
S slip ratio
D driving stiffness
M1 D-μ map

The invention claimed is:

1. A driving force control method for a vehicle, comprising:
   a first step of preliminarily setting a D-μ map or a D-μ calculation formula defining a substantially linear correlation between a driving stiffness and a maximum road surface μ;
   a second step of calculating a slip ratio of a target road wheel of the vehicle;
   a third step of calculating the driving stiffness corresponding to a value of the slip ratio calculated in the second step;
   a fourth step of applying a value of the driving stiffness calculated in the third step to the D-μ map or the D-μ calculation formula to calculate the maximum road surface μ; and
   a fifth step of controlling a driving force of the vehicle, using a value of the maximum road surface μ calculated in the fourth step.

2. The driving force control method according to claim 1, wherein the third step includes calculating the driving stiffness, using at least a value of the slip ratio which is equal to or less than one-half of a value of the slip ratio corresponding to the maximum road surface μ.

3. The driving force control method according to claim 2, wherein the correlation between the driving stiffness and the maximum road surface μ set in the step 1 is linear.

4. The driving force control method according to claim 2, wherein the vehicle comprises a drive source, and a driving force distribution device to distribute the driving force from the drive source between a pair of main drive wheels serving as the target road wheel and a pair of subordinate drive wheels, based on a grip limit index.

5. The driving force control method according to claim 1, wherein the correlation between the driving stiffness and the maximum road surface μ set in the step 1 is linear.

6. The driving force control method according to claim 5, wherein the vehicle comprises a drive source, and a driving force distribution device to distribute the driving force from the drive source between a pair of main drive wheels serving as the target road wheel and a pair of subordinate drive wheels, based on a grip limit index.

7. The driving force control method according to claim 1, wherein the vehicle comprises a drive source, and a driving force distribution device to distribute the driving force from the drive source between a pair of main drive wheels serving as the target road wheel and a pair of subordinate drive wheels, based on a grip limit index.

8. The driving force control method according to claim 7, wherein the fifth step includes setting a distribution ratio of the driving force between the main and subordinate drive wheels, using a ratio between a road surface μ during traveling and the maximum road surface μ.

9. The driving force control method according to claim 7, wherein the fifth step includes setting a distribution ratio of the driving force between the main and subordinate drive wheels, using a friction circle defined by the driving force and a lateral force.

10. A driving force control system for a vehicle, comprising:
    a storage circuit to store a D-μ map or a D-μ calculation formula defining a substantially linear correlation between a driving stiffness and a maximum road surface μ;
    a slip ratio calculation circuit to calculate a slip ratio of a target road wheel of the vehicle;
    a driving stiffness calculation circuit to calculate the driving stiffness corresponding to a value of the slip ratio calculated by the slip ratio calculation circuit;
    a maximum road surface μ calculation circuit to apply a value of the driving stiffness calculated by the driving stiffness calculation circuit to the D-μ map or the D-μ calculation formula to calculate the maximum road surface μ; and a driving force control circuit to control a driving force of the vehicle, using a value of the maximum road surface µ calculated by the maximum road surface µ calculation circuit.

11. A driving force control method for a vehicle, comprising:
preliminarily setting a D-µ map or a D-µ calculation formula defining a substantially linear correlation between a driving stiffness and a maximum road surface µ;
calculating a slip ratio of a target road wheel of the vehicle;
calculating the driving stiffness corresponding to a value of the calculated slip ratio;
applying a value of the calculated driving stiffness to the D-µ map or the D-µ calculation formula to calculate the maximum road surface µ; and
controlling a driving force of the vehicle, using a value of the calculated maximum road surface µ.

* * * * *